J. E. BATCHELDER.
VEHICLE HEADLIGHT.
APPLICATION FILED JAN. 17, 1916.
1,192,977.
Patented Aug. 1, 1916.
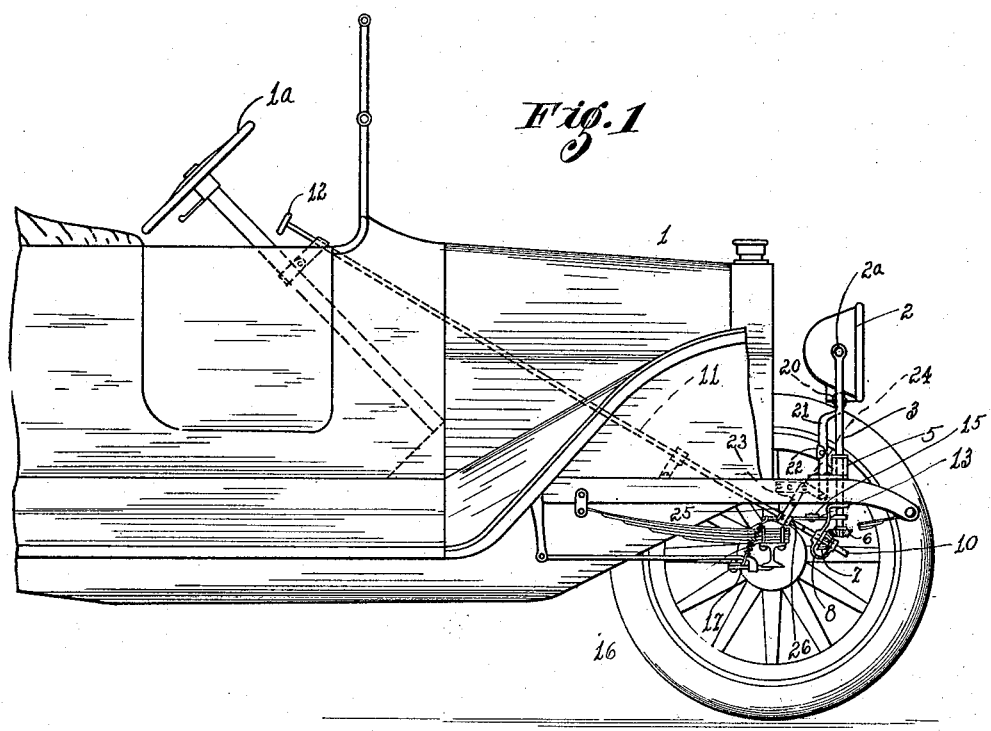
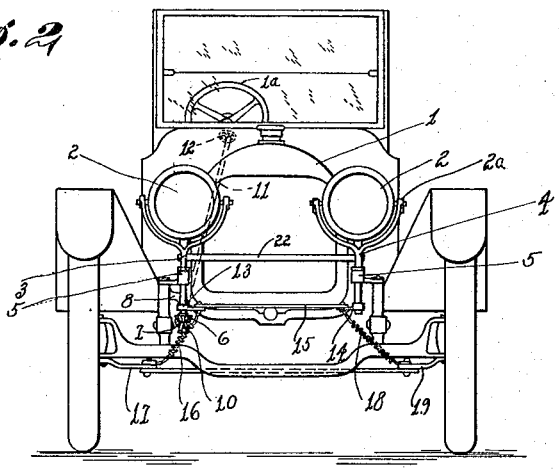
WITNESS:
INVENTOR.
J. E. Batchelder
BY
ATTORNEY

UNITED STATES PATENT OFFICE.

JOHN EIKN BATCHELDER, OF JACKSON, CALIFORNIA.

VEHICLE-HEADLIGHT.

1,192,977.   Specification of Letters Patent.   Patented Aug. 1, 1916.

Application filed January 17, 1916. Serial No. 72,471.

*To all whom it may concern:*

Be it known that I, JOHN E. BATCHELDER, a citizen of the United States, residing at Jackson, in the county of Amador, State of California, have invented certain new and useful Improvements in Vehicle-Headlights; and I do declare the following to be a full, clear, and exact description of the same, reference being had to the accompanying drawings, and to the characters of reference marked thereon, which form a part of this application.

This invention relates to improvements in the attachment on the head-lights mounted on motor vehicles whereby the same may be made dirigible for turning in such directions as the vehicle may be turned, this being accomplished by connection with the steering mechanism of the vehicle and in addition to this I provide a manual operating means operable at or near the steering wheel of the vehicle whereby the lamps may be turned in either direction or up and down as may be required. Traveling at night especially in mountainous country is very dangerous with the ordinary form of head-lights due to the fact that in cresting a hill they throw off into space instead of down upon the road and the road often turns and twists and drops off at an angle just at the crest of a hill which renders it extremely dangerous in the manipulation of the vehicle where the road can not be seen with the lights. Also in twisting around winding roads the lights are of very little benefit when rigidly attached to the vehicle. It is these conditions which my improved dirigible attachment is designed to overcome.

A further object of the invention is to produce a simple and inexpensive device and yet one which will be exceedingly effective for the purposes for which it is designed.

These objects I accomplish by means of such structure and relative arrangement of parts as will fully appear by a perusal of the following specification and claim.

In the drawings similar characters of reference indicate corresponding parts in the several views.

Figure 1 is a side elevation of a motor vehicle partly broken away showing my improved attachment for the lights. Fig. 2 is a front elevation of the vehicle showing such attachment in operative position.

Referring now more particularly to the characters of reference on the drawings the numeral 1 designates the vehicle and 2 the head-lights thereon which in my improved structure are supported upon rods 3 and 4 which are turnable through brackets 5 suitably mounted on the frame of the vehicle. At the lower end of one of the rods 3 or 4 is a small beveled gear 6 which intermeshes with another beveled gear 7 held in a bracket 8. The square end 10 of a rod 11 is slidable through the beveled gear 7. Said rod 11 projects to a point adjacent the steering wheel $1^a$ where it is provided with an operating handle 12. The rods 3 and 4 have projecting arms 13 and 14 connected by a link 15. A spring 16 is connected with an arm 13 and with one of the steering arms 17 on one front wheel of the vehicle. Similarly a spring 18 is connected with the arm 14 and with the other steering arm 19 on the other front wheel of the vehicle. When the front wheels are turned by means of the steering wheel $1^a$ in one direction (we will say to the left of Fig. 2) this will tend to lessen the tension of the spring 16 and increase the tension of the spring 18 whereupon the action of said springs will tend to neutralize each other and the spring 18 will pull on the arm 14 and through the medium of the link 15 will pull on the arm 13 which action will turn the rods 3 and 4 and incidentally the lamps 2 in the same direction as the wheels are turned; and vice versa if the wheels are turned in the opposite direction. If this action does not sufficiently turn the lights to suit the operator he may grasp the handle 12 and through the medium of the rod 11 and gears 6 and 7 turn the rods 3 and 4 to any desired extent.

The above operation describes the mechanism for turning the lamps in the same direction as the vehicle may be turned and in addition to this I have provided a means for throwing them up or down which is constructed and operates as follows namely: Each of the lamps 2 is pivotally mounted in its bracket, as at $2^a$, and by means of ball and socket joints 20 I connect rods 21 therewith said rods 21 being connected by a cross link 22. On the lower end of one of the rods 22 I connect a bell crank 23 pivotally mounted to the frame of the vehicle as at 24. The other end of the bell crank 23 is provided with a collar 25 mounted on the rod 11 in such a manner as to allow said rod 11 to be turned therein so as not to hinder the previous operation described above. The position of the collar 25 on the rod 11 is determined by small collars 26. Thus by grasping the handle 12 and pulling the rod 11 in one direction or the other (this action being allowed by the square end 10 sliding through the gear 7) the bell crank 23 may be moved in one direction or the other which will push the rods 21 freely up or down with a consequent upward or downward movement of the lamps 2 with apparent results.

From the foregoing description it will readily be seen that I have produced such a device as substantially fulfils the objects of the invention as set forth herein.

While this specification sets forth in detail the present and preferred construction of the device, still in practice such deviations from such detail may be resorted to as do not form a departure from the spirit of the invention as defined by the appended claim.

Having thus described my invention what I claim as new and useful and desire to secure by Letters Patent is:

Dirigible motor vehicle lamps comprising turnable supports, a beveled gear on one support, another beveled gear mounted independently of the support and meshing with the first named beveled gear, a turnable rod having a square end projecting through the second named gear, lamps pivotally mounted in the supports, rods flexibly connected with said lamps and linked together, and a bell crank connected with one of said last named rods and with said turnable rod, as described.

In testimony whereof, I affix my signature.

JOHN EIKN BATCHELDER.

Copies of this patent may be obtained for five cents each, by addressing the "Commissioner of Patents, Washington, D. C."